United States Patent [19]
Erikson et al.

[11] Patent Number: 5,913,941
[45] Date of Patent: Jun. 22, 1999

[54] REINFORCED LEAD SCREW

[75] Inventors: Keith W. Erikson, Hollis; Kenneth W. Erikson, Amherst, both of N.H.

[73] Assignee: Kerk Motion Products, Inc., Hollis, N.H.

[21] Appl. No.: 08/842,849

[22] Filed: Apr. 17, 1997

[51] Int. Cl.⁶ .................................................. F16H 55/17
[52] U.S. Cl. ............................................ 74/459; 74/89.15
[58] Field of Search .................................... 74/459, 89.15, 74/424.8 R

[56] References Cited

U.S. PATENT DOCUMENTS

| | | |
|---|---|---|
| 4,566,345 | 1/1986 | Erikson et al. . |
| 5,079,963 | 1/1992 | Yamamoto et al. .................. 74/459 X |
| 5,689,997 | 11/1997 | Schaller .............................. 74/89.15 X |

FOREIGN PATENT DOCUMENTS

| | | |
|---|---|---|
| 0 529 563 A2 | 8/1992 | European Pat. Off. . |
| 0 559 441 A1 | 3/1993 | European Pat. Off. . |
| 0 577 390 A2 | 6/1993 | European Pat. Off. . |

*Primary Examiner*—John A. Jeffery
*Assistant Examiner*—David Fenstermacher
*Attorney, Agent, or Firm*—Hamilton, Brook, Smith & Reynolds, P.C.

[57] ABSTRACT

The reinforced lead screw has a hollow, elongate reinforcing rail surrounding a lead screw and a nut-bearing movable along the reinforcing rail. The nut-bearing has a portion projecting through a slot in the reinforcing rail and includes threads to engage the threads on the lead screw such that when the lead screw is rotated in either direction, the nut will translate along the rail. The rail may be provided with a sleeve-bearing which, in combination with the rail, serves not only as a guide for movement of the nut but lateral support for the lead screw.

16 Claims, 3 Drawing Sheets

REINFORCED LEAD SCREW

BACKGROUND OF THE INVENTION

In U.S. Pat. No. 4,566,345, which issued Jan. 26, 1986, the present inventors disclosed a carrier for mounting a tool for reciprocating motion along a pair of spaced, parallel guide rails. The carrier is reciprocated by a rotating lead screw extending lengthwise between and parallel to the guide rails and engaging an internally threaded nut in the carrier. The nut may be an anti-backlash nut. With the lead screw located between the rails, there are bearing supports extending laterally from the carrier, each mounting a bearing which slides on a guide rail much in the manner of outrigger pontoons.

The rails serve a number of purposes. They create a low-friction guideway for the carrier to ride on but, more importantly, they create an anti-rotation mechanism for the carriage. If there were no guide rails and the carrier were mounted on the lead screw only, the carrier probably would not reciprocate. This is because the mass of the carrier would create high frictional resistance between its threaded nut and the lead screw such that the carrier would rotate with the lead screw rather than traversing it. Secondly, again, if there were no guide rails and if the lead screw were oriented in a horizontal direction, the flexure of the lead screw, created by the weight of the carrier and the tool that it mounts, would cause the carrier to bind on the lead screw and/or cause the tool that it mounts to disengage from its workpiece.

Yet another problem can exist. Tools mounted on the carrier are normally offset from the central axis of the lead screw. In addition, the tools are mounted on posts in a cantilevered position relative to the carrier. Normal drag of the tool relative to its workpiece creates a torque which is imparted through the tool post to the carrier and, hence, to the supports riding on the rails which carry the bearings. This can cause unnecessary drag, monkey-biting, or can conceivably result in the lead screw's driving motor to stall out.

Another shortcoming in certain applications where space is limited is the size of the mechanism. Two guide rails spaced laterally of a lead screw creates a drive mechanism which is spread out, generally horizontally, and, in some machine operations, there is not sufficient space to do this. In addition, it is difficult to obtain initial alignment of the screw and two parallel rails.

It is to the solution of these problems that the present invention is directed.

SUMMARY OF THE INVENTION

The invention resides in a reinforced lead screw assembly which includes a threaded lead screw rotatable about a central axis by a reversible motor. Surrounding the lead screw is a rigid, hollow, elongate reinforcing rail which extends lengthwise end to end of the screw. A nut-bearing is movable along the reinforcing rail and is driven by the screw. There is a slot in the reinforcing rail which extends lengthwise of the central axis of the lead screw. A projection or tongue on the nut extends in a radial direction through the slot in the reinforcing rail. The tongue or projection is engagable with the walls of the slot to prevent rotation of the nut-bearing relative to the rail. The tongue or projection mounts threads which are engagable with the threads of the lead screw. Consequently, when the lead screw is rotated in either direction, the nut will translate lengthwise of the screw.

A sleeve bearing is insertable in the reinforcing rail which is made of low-friction, plastic material and engages the threads of the lead screw to offer lateral support in cooperation with the reinforcing rail itself.

The projection on the nut has either partial threads engagable with the threads of the lead screw or mounts a circular hub which is internally threaded to engage the lead screw.

The reinforcing rail may include at least one flat extending lengthwise which is engagable with a mating flat in the nut to supplement the anti-rotation function of the tongue and the slot in the rail to prevent the nut from rotating relative to the reinforcing rail. The outer surface of the reinforcing rail may be coated with a low-friction material such as PTFE, NYLON or the like. The nut-bearing also may be made of self-lubricating material such as acetyl and may include PTFE carbon fiber additive or other lubricating additives for low frictional engagement with the lead screw. It may be molded around or attached to a ball bushing for added stiffness and lubricity. The sleeve bearing located within the lead screw may be made of NYLON or DELRIN like plastic material.

The above and other features of the invention including various and novel details of construction and combination of parts will now be more particularly described with reference to the accompanying drawings and pointed out in the claims. It will be understood that the particular reinforced lead screw embodying the invention is shown by way of illustration only and not as a limitation of the invention. The principles and features of this invention may be employed in varied and numerous embodiments without departing from the scope of the invention.

DETAILED DESCRIPTION OF THE INVENTION

Figure 1:
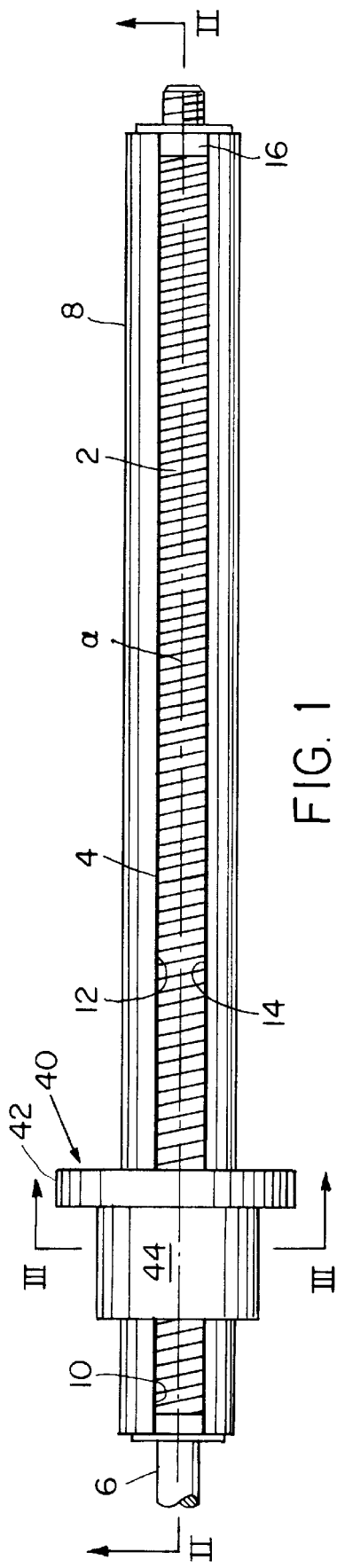
FIG. 1 is a plan view of a reinforced lead screw embodying the present invention.

The reinforced lead screw is seen assembled in plan view in FIG. 1. It comprises a screw 2 rotatable about an axis α and having threads 4 formed along its length. A projection 6 is formed on one end of the lead screw to connect it to a reversible driving motor (not shown) in order to rotate the lead screw alternatively in clockwise and counterclockwise direction.

Surrounding lead screw 2 is an elongate reinforcing rail 8 which extends lengthwise of the screw. The reinforcing rail is hollow to accommodate the lead screw and includes a slot 10 extending lengthwise and parallel to the central axis α of the lead screw. The slot includes side walls 12 and 14 (FIGS. 3 and 5) which may constitute bearing surfaces as will be explained in further detail hereinafter. The lead screw is journaled within the reinforcing rail by bearings 16 and 18 for rotation relative to the reinforcing rail.

Figure 2:
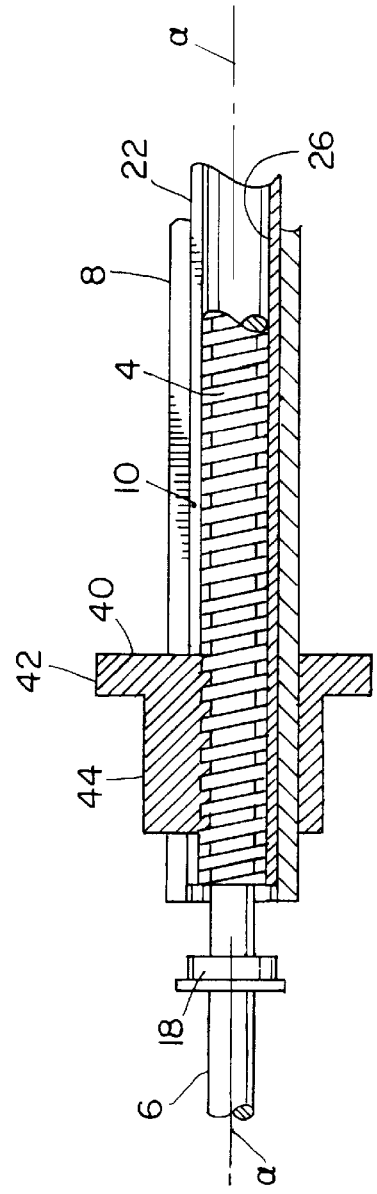
FIG. 2 is a partial sectional view taken along the lines II—II on FIG. 1.

With reference to FIG. 2, there will be seen an elongate sleeve bearing 22 extending lengthwise of the reinforcing rail. The bearing is made of a low-friction plastic such as PTFE, "or plastic sold under the trademarks," NYLON or DELRIN and has a circular interior and engages the threads 24 of the lead screw. It functions as a radial support for the lead screw preventing the screw from whipping or vibrating as it is rotated.

The sleeve bearing 22 includes a slot 26 (FIG. 2) having sidewalls 28 and 30 (FIG. 3) which, when assembled in the rail 8, are essentially continuations of the sidewalls 12 and 14, respectively, of the slot 10 in the reinforcing rail. The slots 10 and 26 are aligned with each other.

In operation, the reinforcing guide rail 8 would be secured in a machine structure by any convenient means (not shown) with a reversible driving motor attached to the lead screw 2.

Figure 3:
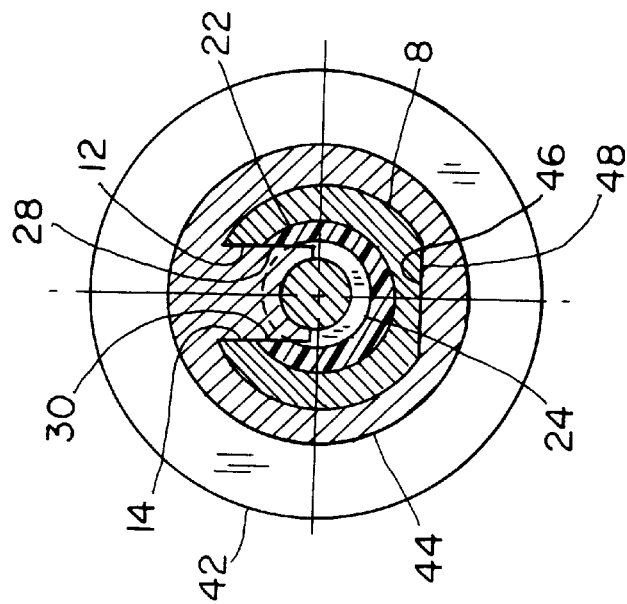
FIG. 3 is a sectional view through the reinforced guide rail and the nut-bearing taken along the lines III—III on FIG. 1 with the lead screw and reinforcing rail removed.

A nut-bearing, generally indicated 40, which may be metal or, preferably, moldable plastic such as acetyl with carbon filter additives is movable in bilateral direction along the reinforcing rail. The nut-bearing may optionally have anti-backlash properties. The nut-bearing includes a flange 42 which is illustrated as circular but may be constructed in any convenient shape depending on the tool or load to be attached. The nut-bearing includes a body portion 44 and which, as will be seen in FIG. 4, is provided with an optional internal flat 46 which is engagable with an optional mating flat 48 formed on the bottom of the reinforcing rail (FIG. 3).

The element 40 is called a nut-bearing because it functions as both. It functions as a nut-bearing because, as will be seen hereinafter, it is internally threaded and is moved by the lead screw. Secondly, it has internal bearing surfaces and slides on the rail.

Figure 5:
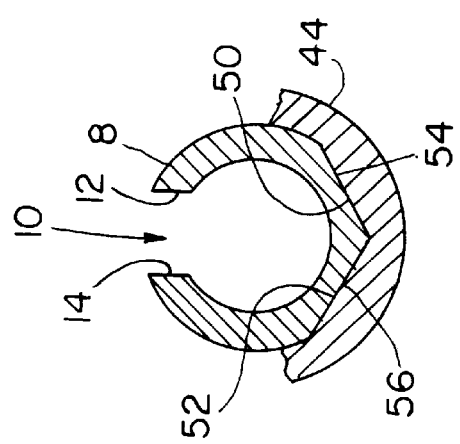
FIG. 5 is a schematic sectional view of part of the guide rail and the nut-bearing illustrating another embodiment of the flats.

As will be seen in FIG. 5, a plurality of flats 50 and 52 (hereinafter illustrated as only two) may be formed in the nut-bearing which are engagable with mating flats 54 and 56 on the reinforcing rail 8.

Figure 4:
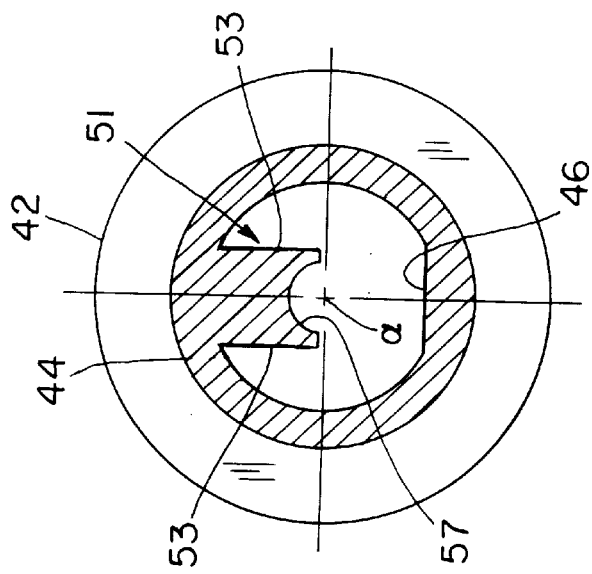
FIG. 4 is a view similar to FIG. 3 with the lead screw and the reinforcing rail removed and having one flat on the nut-bearing.

As will be seen in FIG. 4, the nut-bearing 40 includes a projecting portion or tongue 51 extending radially inwardly. It has parallel sides 53 which are engagable with the sides "12, 14, 28 and 30" of the aligned slots 10 and 26 formed in the guide rail 8 and the bearing 22 respectively. This engagement also assures that, in addition to the functioning of flats 46, 48, the nut will not rotate relative to the guide rail 8 when the lead screw is rotated.

The purpose of the optional flat 50, 52, 54, 56 be there one or a plurality, is to supplement the auto-rotational function of the tongue 51 and the slots 10 and 26 in preventing the nut 40 from rotating relative to the reinforcing rail 8 when the lead screw 2 is rotated. This could be the case where the frictional engagement between the threads of the lead screw and the nut is greater than the frictional engagement between the nut and the exterior of the guide rail.

Arcuate threads 57 (FIG. 3) are formed at the innermost end of the projection 51. The threads are engagable with the threads 4 of the lead screw 2 such that when the lead screw is rotated, either clockwise or counterclockwise, the nut-bearing 40 will translate relative to the reinforcing rail 8.

Figure 7:
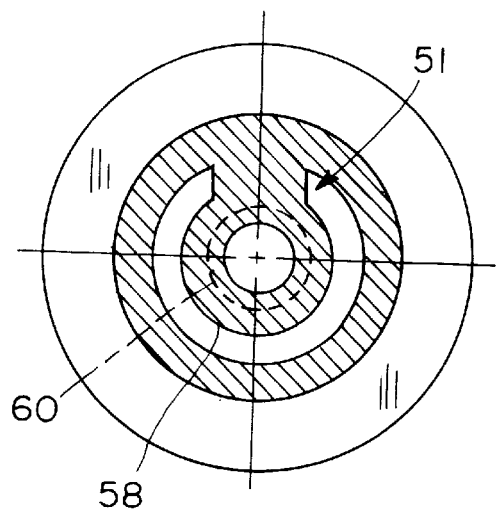
FIGS. 7 and 8 are views similar to FIGS. 3 and 4, respectively, of an alternative construction of the nut-bearing.
Figure 8:
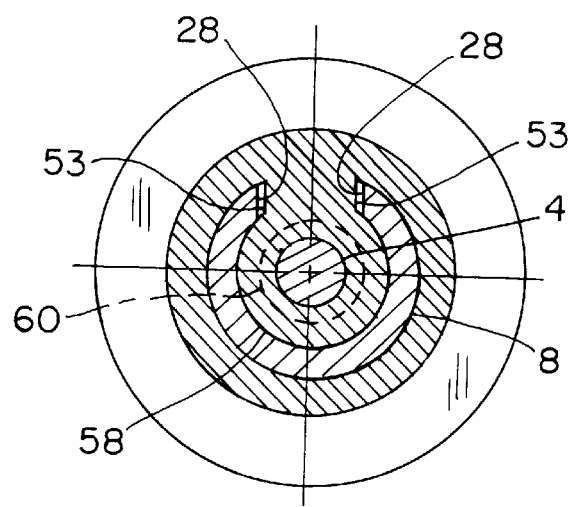

As will be seen in FIGS. 7 and 8, an alternative construction of the nut-bearing 40 will be seen. A circular hub portion 58 is formed on the tongue or projection 51 and it has internal threads 60 (FIG. 8) which encircle and engage the threads 4 of the lead screw 2. In FIG. 8, the sides 28 of the slot of the reinforcing rail 8 are shown separated from the sides 53 of the projection 51. This is optional construction. The internal threads 60 of the hub 58 are in mating engagement with the threads 4 of the lead screw.

Functionally, the FIG. 7 embodiment of the nut operates in the same manner as the FIG. 3 embodiment.

Figure 6:
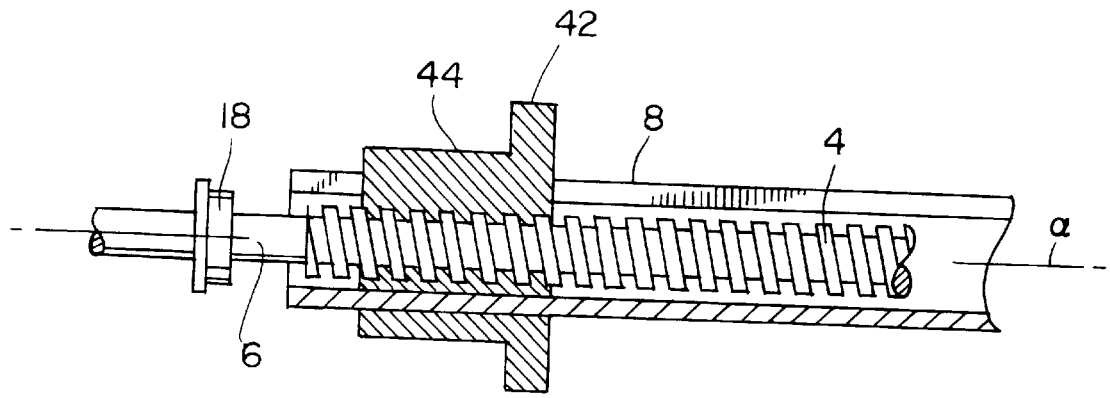
FIG. 6 is a sectional view similar to FIG. 2 with the sleeve bearing removed.

FIG. 6 is a view similar to FIG. 2 with the sleeve bearing 22 removed. If a high degree of flexure of the lead screw were anticipated, this would not be done or, conversely, the reinforcing rail 8 would be constructed with a smaller diameter such that it could engage the crests of the threads formed on the lead screw. Furthermore, the longer the lead screw is, the more need there is for the reinforcing bearing to support the lead screw against whipping.

With the present invention, there is no need for lateral guide rails for the nut, or if a carriage is attached, to ride on, since the reinforcing rail 8 is generally sufficient except in very large tool requirements. Since the breadth of the single rail construction is smaller, there is less chance for canting or skewing of the nut because its load can be mounted closer to the axis α. Circular loads can also be attached to the nut 44 surrounding the reinforced lead screw where there would be little or no torque applied to the nut to cause it to bind on the guide rail 8.

The invention claimed is:

1. A reinforced lead screw assembly comprising:

a threaded lead screw rotatable about a central axis;

a hollow, elongate reinforcing rail extending the length of and surrounding the lead screw for providing radial support for the screw;

a slot in the reinforcing rail extending lengthwise of the central axis;

a nut-bearing moveable along the reinforcing rail;

a portion of the nut-bearing extending through the slot; and internal threads on the extending portion of the nut-bearing engageable with the threads on the lead screw for moving the nut-bearing in reciprocating motion lengthwise of the rail when the lead screw is rotated.

2. A reinforced lead screw assembly according to claim 1, having at least one flat extending lengthwise of the reinforcing rail and a mating flat in the nut-bearing to prevent the nut from rotating relative to the reinforcing rail.

3. A reinforced lead screw assembly according to claim 1, having a plurality of flats extending lengthwise of the reinforcing rail and mating flats in the nut-bearing to prevent the nut from rotating relative to the reinforcing rail.

4. A reinforced lead screw assembly according to claim 1, wherein the portion of the nut-bearing extending through the slot mounts a circular hub which has formed on it the internal threads which are engagable with the threads of the lead screw.

5. A reinforced lead screw assembly comprising:

a threaded lead screw rotatable about a central axis;

a hollow elongate reinforcing rail extending the length of and surrounding the lead screw to provide radial support for the screw;

a slot in the reinforcing rail extending lengthwise of the central axis;

an elongate bearing engagable with the lead screw within the reinforcing rail having a slot aligned with the slot in the reinforcing rail;

a nut-bearing moveable along the reinforcing rail;

a portion of the nut-bearing extending through the aligned slots; and internal threads on the extending portion of the nut-bearing engageable with the threads on the lead screw for moving the nut in reciprocating motion lengthwise of the rail when the lead screw is rotated.

6. A reinforced lead screw assembly according to claim 5, comprising at least one flat extending lengthwise of the reinforcing rail and at least one mating flat in the nut-bearing to prevent the nut from rotating relative to the reinforcing rail.

7. A reinforced lead screw assembly according to claim 5, having a plurality of flats extending lengthwise of the reinforcing rail and mating flats in the nut-bearing to prevent the nut from rotating relative to the reinforcing rail.

8. A reinforced lead screw assembly according to claim 5, wherein the nut-bearing threads are formed on the portion of the nut-bearing which extends through the aligned slots.

9. A reinforced lead screw assembly according to claim 5, wherein the portion of the nut-bearing which extends through the aligned slots mounts a circular hub which has formed on it the internal threads which are engagable with the threads of the lead screw.

10. A reinforced lead screw assembly according to claim 5, wherein the sleeve-bearing has an arcuate interior engageable with the threads of the lead screw.

11. A reinforced lead screw assembly according to claim 5, wherein the sleeve-bearing is made of a low friction plastic material.

12. A reinforced lead screw assembly comprising:

a threaded lead screw rotatable about a central axis;

a hollow elongate reinforcing rail extending the length of and surrounding the lead screw for providing radial support for the screw;

a slot in the reinforcing rail extending lengthwise of the central axis;

bearing surfaces forming the sides of the slot;

an elongate sleeve-bearing within the reinforcing rail having a slot aligned with the slot in the reinforcing rail;

a nut-bearing moveable along the reinforcing rail;

a projection on the nut-bearing extending through the aligned slots and engagable with the bearing surfaces; and threads on the nut-bearing engageable with the threads on the lead screw for moving the nut-bearing in reciprocating motion lengthwise of the rail when the lead screw is rotated.

13. A reinforced lead screw assembly according to claim 12, comprising at least one flat extending lengthwise of the reinforcing rail and at least one mating flat in the nut-bearing to prevent the nut-bearing from rotating relative to the reinforcing rail.

14. A reinforced lead screw assembly according to claim 12, having a plurality of flats extending lengthwise of the reinforcing rail and mating flats in the nut-bearing to prevent the nut-bearing from rotating relative to the reinforcing rail.

15. A reinforced lead screw assembly according to claim 12, wherein the threads on the nut-bearing are formed on the projection in the shape of an arc.

16. A reinforced lead screw assembly according to claim 12, wherein the projection on the nut-bearing mounts a circular hub which has internal threads engagable with the threads of the lead screw.

* * * * *